(12) United States Patent
Hasan

(10) Patent No.: US 10,717,251 B2
(45) Date of Patent: Jul. 21, 2020

(54) REPAIR PATCH FOR COMPOSITE STRUCTURE AND ASSOCIATED METHOD

(71) Applicant: The Boeing Company, Chicago, IL (US)

(72) Inventor: Zeaid F. Hasan, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/379,320

(22) Filed: Apr. 9, 2019

(65) Prior Publication Data

US 2019/0232614 A1 Aug. 1, 2019

Related U.S. Application Data

(62) Division of application No. 15/498,116, filed on Apr. 26, 2017, now Pat. No. 10,293,576.

(51) Int. Cl.

| | |
|---|---|
| *C01B 32/158* | (2017.01) |
| *B32B 7/12* | (2006.01) |
| *B32B 27/06* | (2006.01) |
| *B32B 37/12* | (2006.01) |
| *B64F 5/40* | (2017.01) |
| *B64C 3/26* | (2006.01) |
| *B64C 1/12* | (2006.01) |
| *B82Y 30/00* | (2011.01) |

(52) U.S. Cl.
CPC .............. *B32B 7/12* (2013.01); *B32B 27/06* (2013.01); *B32B 37/12* (2013.01); *B64C 1/12* (2013.01); *B64C 3/26* (2013.01); *B64F 5/40* (2017.01); *C01B 32/158* (2017.08); *B32B 2556/00* (2013.01); *B32B 2605/18* (2013.01); *B82Y 30/00* (2013.01); *Y10S 977/742* (2013.01)

(58) Field of Classification Search
CPC .................................................... C01B 32/158
USPC ........................................................... 428/63
See application file for complete search history.

(56) References Cited

U.S. PATENT DOCUMENTS

| | | | |
|---|---|---|---|
| 2010/0276065 A1 | 11/2010 | Blanchard et al. | |
| 2014/0326389 A1 | 11/2014 | Blanchard et al. | |
| 2015/0090392 A1* | 4/2015 | Bertrand | B32B 43/00 156/64 |

OTHER PUBLICATIONS

Johnson, et al., Fabrication and Characterization of Multi-Walled Carbon Nanotube (MWCNT) and Ni-coated Multi-Nailed Carbon Nanotube (Ni-MWCNT) Repair Patches for Carbon Fiber Reinforced Composite Systems, NASA USRP-Internship Final Report, 2011, pp. 1-12.

(Continued)

*Primary Examiner* — Brent T O'Hern
(74) *Attorney, Agent, or Firm* — Kunzler Bean & Adamson

(57) ABSTRACT

Disclosed herein is a method of repairing a composite structure comprising fiber-reinforced polymer plies each with unidirectional fibers. The method comprises removing a damaged portion of the composite structure to form a void in the composite structure. The method also comprises positioning an adhesive layer into the void. The method further comprises positioning a first nanotube sheet ply and a first fiber-reinforced polymer repair ply into the void, by first positioning one of the first nanotube sheet ply or the first fiber-reinforced polymer repair ply into the void over the adhesive layer. The first nanotube sheet ply is fiberless and the first fiber-reinforced polymer repair ply comprises unidirectional fibers.

20 Claims, 11 Drawing Sheets

(56) References Cited

OTHER PUBLICATIONS

Johnson, et al., Fabrication and Characterization of MWCNT and Ni-MWCNT Repair Patch for Carbon Fiber Reinforced Composite Systems, Presentation Slides, 2011.

* cited by examiner

_200_

| Ply | Panel | | Patch | |
| --- | --- | --- | --- | --- |
| | Material | Fiber Angle | Material | Fiber Angle |
| 01 | ---- | ---- | Adhesive | N/A |
| 1 | Composite | A | Nanocomposite | N/A |
| 2 | Composite | B | Composite | B |
| 3 | Composite | A | Nanocomposite | N/A |
| 4 | Composite | B or C | Composite | B or C |

*FIG. 13*

| Ply | Panel | | Patch | |
|---|---|---|---|---|
| | Material | Fiber Angle | Material | Fiber Angle |
| 01 | ---- | ---- | Adhesive | N/A |
| 1 | Composite | A | Composite | A |
| 2 | Composite | B | Nanocomposite | N/A |
| 3 | Composite | A | Composite | A |
| 4 | Composite | B or C | Nanocomposite | N/A |
| 5 | Composite | A | Composite | A |

FIG. 14

REPAIR PATCH FOR COMPOSITE STRUCTURE AND ASSOCIATED METHOD

FIELD

This disclosure relates generally to composite structures, and more particularly to repairing composite structures using a repair patch.

BACKGROUND

Many structures are made of fiber-reinforced polymers because of their high strength and low weight. However, repairing damage to fiber-reinforced polymer structures can be complicated, time-intensive, and expensive. Although some techniques, such as scarf repair techniques, have been designed specifically to repair fiber-reinforced polymer structures, such techniques still suffer from several shortcomings. For example, some conventional scarf repairs fail due to uneven temperature distribution during a curing step of the repair. Additionally, certain conventional scarf repairs require tedious layer-by-layer fiber alignment between a repair patch and the underlying fiber-reinforced polymer structure.

SUMMARY

The subject matter of the present application has been developed in response to the present state of the art, and in particular, in response to the shortcomings of composite structure repair that have not yet been fully solved by currently available techniques. Accordingly, the subject matter of the present application has been developed to provide a repair patch and method of repairing a composite structure that overcome at least some of the above-discussed shortcomings of prior art techniques.

Disclosed herein is a method of repairing a composite structure comprising fiber-reinforced polymer plies each with unidirectional fibers. The method comprises removing a damaged portion of the composite structure to form a void in the composite structure. The method also comprises positioning an adhesive layer into the void. The method further comprises positioning a first nanotube sheet ply and a first fiber-reinforced polymer repair ply into the void, by first positioning one of the first nanotube sheet ply or the first fiber-reinforced polymer repair ply into the void over the adhesive layer. The first nanotube sheet ply is fiberless and the first fiber-reinforced polymer repair ply comprises unidirectional fibers. The preceding subject matter of this paragraph characterizes example 1 of the present disclosure.

The method further comprises, when the first fiber-reinforced polymer repair ply is positioned over the first nanotube sheet ply, positioning a second nanotube sheet ply into the void over the first fiber-reinforced polymer repair ply and positioning a second fiber-reinforced polymer repair ply over the second nanotube sheet ply. The second nanotube sheet ply is fiberless and the second fiber-reinforced polymer repair ply comprises unidirectional fibers. The method additionally comprises, when the first nanotube sheet ply is positioned over the first fiber-reinforced polymer repair ply, positioning the second fiber-reinforced polymer repair ply over the first nanotube sheet ply and positioning the second nanotube sheet ply over the second fiber-reinforced polymer repair ply. The preceding subject matter of this paragraph characterizes example 2 of the present disclosure, wherein example 2 also includes the subject matter according to example 1, above.

The void has a frusto-conical shape. When the first nanotube sheet ply is positioned into the void over the adhesive layer, the first fiber-reinforced polymer repair ply has a diameter greater than a diameter of the first nanotube sheet ply. When the first fiber-reinforced polymer repair ply is positioned into the void over the adhesive layer, the first nanotube sheet ply has a diameter greater than a diameter of the first fiber-reinforced polymer repair ply. The preceding subject matter of this paragraph characterizes example 3 of the present disclosure, wherein example 3 also includes the subject matter according to any one of examples 1-2, above.

The method further comprises curing the first fiber-reinforced polymer repair ply when positioned in the void. Curing the first fiber-reinforced polymer repair ply comprises flowing a portion of a resin of the first fiber-reinforced polymer repair ply into the first nanotube sheet ply. The preceding subject matter of this paragraph characterizes example 4 of the present disclosure, wherein example 4 also includes the subject matter according to any one of examples 1-3, above.

The method further comprises positioning a first resin layer into the void directly adjacent a first side of the first nanotube sheet ply. The method also comprises curing the first fiber-reinforced polymer repair ply when positioned in the void. Curing the first fiber-reinforced polymer repair ply comprises flowing the first resin layer into the first nanotube sheet ply. The preceding subject matter of this paragraph characterizes example 5 of the present disclosure, wherein example 5 also includes the subject matter according to any one of examples 1-3, above.

The method further comprises positioning a second resin layer into the void directly adjacent a second side of the first nanotube sheet ply. The second side of the first nanotube sheet ply is opposite the first side of the first nanotube sheet ply. Curing the first fiber-reinforced polymer repair ply when positioned in the void further comprises flowing the second resin layer into the first nanotube sheet ply. The preceding subject matter of this paragraph characterizes example 6 of the present disclosure, wherein example 6 also includes the subject matter according to example 5, above.

The method further comprises pre-impregnating the first nanotube sheet ply with a resin before positioning the first nanotube sheet ply into the void. The preceding subject matter of this paragraph characterizes example 7 of the present disclosure, wherein example 7 also includes the subject matter according to any one of examples 1-3, above.

The method further comprises monitoring an electrical signal through the first nanotube sheet ply and determining a repair status of the composite structure in response to characteristics of the electrical signal. The preceding subject matter of this paragraph characterizes example 8 of the present disclosure, wherein example 8 also includes the subject matter according to any one of examples 1-7, above.

The unidirectional fibers of a first fiber-reinforced polymer ply of the composite structure are oriented in a first direction. The unidirectional fibers of a second fiber-reinforced polymer ply of the composite structure are oriented in a second direction, different than the first direction. The first fiber-reinforced polymer ply and the second fiber-reinforced polymer ply are directly adjacent each other. The method further comprises orienting the first fiber-reinforced polymer repair ply such that the unidirectional fibers of the first fiber-reinforced polymer repair ply are parallel to one of the first fiber-reinforced polymer ply or the second fiber-reinforced polymer ply of the composite structure. The preceding subject matter of this paragraph characterizes example 9 of the present disclosure, wherein example 9 also includes the subject matter according to any one of examples 1-8, above.

Also disclosed herein is an aircraft comprising a composite panel. The composite panel comprises fiber-reinforced polymer plies each with unidirectional fibers. The aircraft also comprises a repair site formed in the composite panel. The repair site comprises a void and a patch in the void. The patch comprises a first nanotube sheet ply comprising multi-directional nanotubes embedded within a first resin. The first nanotube sheet ply is without fibers. The patch also comprises a first fiber-reinforced polymer repair ply directly adjacent the first nanotube sheet ply and comprising unidirectional fibers embedded within a second resin. The preceding subject matter of this paragraph characterizes example 10 of the present disclosure.

The composite panel and the patch form a scarf joint and the patch is nestably engaged with the composite panel within the void. The preceding subject matter of this paragraph characterizes example 11 of the present disclosure, wherein example 11 also includes the subject matter according to example 10, above.

The aircraft further comprises an adhesive layer in the void between the patch and the composite panel. The preceding subject matter of this paragraph characterizes example 12 of the present disclosure, wherein example 12 also includes the subject matter according to any one of examples 10-11, above.

The first resin and the second resin are the same. The preceding subject matter of this paragraph characterizes example 13 of the present disclosure, wherein example 13 also includes the subject matter according to any one of examples 10-12, above.

The first resin and the second resin are different. The preceding subject matter of this paragraph characterizes example 14 of the present disclosure, wherein example 14 also includes the subject matter according to any one of examples 10-12, above.

The fiber-reinforced polymer plies of the composite panel comprise at least a first fiber-reinforced polymer ply with unidirectional fibers in a first direction and a second fiber-reinforced polymer ply with unidirectional fibers in a second direction, different than the first direction. The first fiber-reinforced polymer repair ply of the patch is co-planar with the first fiber-reinforced polymer ply. The unidirectional fibers of the first fiber-reinforced polymer repair ply are in a third direction, parallel to the first direction. The first nanotube sheet ply of the patch is co-planar with the second fiber-reinforced polymer ply. The preceding subject matter of this paragraph characterizes example 15 of the present disclosure, wherein example 15 also includes the subject matter according to any one of examples 10-14, above.

The fiber-reinforced polymer plies of the composite panel comprise at least a first fiber-reinforced polymer ply with unidirectional fibers in a first direction, a second fiber-reinforced polymer ply with unidirectional fibers in a second direction, a third fiber-reinforced polymer ply with unidirectional fibers in a third direction, and a fourth fiber-reinforced polymer ply with unidirectional fibers in a fourth direction. The patch further comprises a second nanotube sheet ply comprising multi-directional nanotubes embedded within a third resin. The second nanotube sheet ply is without fibers and the third resin is the same as the first resin. The patch further comprises a second fiber-reinforced polymer repair ply directly adjacent the second nanotube sheet ply and comprising unidirectional fibers embedded within a fourth resin. The fourth resin is the same as the second resin.

The first fiber-reinforced polymer repair ply of the patch is co-planar with the first fiber-reinforced polymer ply of the composite panel and the unidirectional fibers of the first fiber-reinforced polymer repair ply are parallel to the unidirectional fibers of the first fiber-reinforced polymer ply. The first nanotube sheet ply of the patch is co-planar with the second fiber-reinforced polymer ply of the composite panel. The second fiber-reinforced polymer repair ply of the patch is co-planar with the third fiber-reinforced polymer ply of the composite panel and the unidirectional fibers of the second fiber-reinforced polymer repair ply are parallel to the unidirectional fibers of the third fiber-reinforced polymer ply. The second nanotube sheet ply of the patch is co-planar with the fourth fiber-reinforced polymer ply of the composite panel. The preceding subject matter of this paragraph characterizes example 16 of the present disclosure, wherein example 16 also includes the subject matter according to any one of examples 10-14, above.

One of the second fiber-reinforced polymer repair ply of the patch is directly adjacent the first nanotube sheet ply of the patch, or the second nanotube sheet ply of the patch is directly adjacent the first fiber-reinforced polymer repair ply of the patch. The preceding subject matter of this paragraph characterizes example 17 of the present disclosure, wherein example 17 also includes the subject matter according to example 16, above.

Further disclosed herein is a repair patch for repairing a composite structure comprising fiber-reinforced polymer plies each with unidirectional fibers. The repair patch comprises a first nanotube sheet ply comprising multi-directional carbon nanotubes. The first nanotube sheet ply is without fibers. The repair patch also comprises a first fiber-reinforced polymer repair ply stacked relative to the first nanotube sheet ply and comprises unidirectional fibers embedded within a resin. The preceding subject matter of this paragraph characterizes example 18 of the present disclosure.

The first nanotube sheet ply is void of resin. The preceding subject matter of this paragraph characterizes example 19 of the present disclosure, wherein example 19 also includes the subject matter according to example 18, above.

The repair patch further comprises a first resin layer between the first nanotube sheet ply and the first fiber-reinforced polymer repair ply. The repair patch further comprises a second resin layer. The first nanotube sheet ply is sandwiched between the first resin layer and the second resin layer. The preceding subject matter of this paragraph characterizes example 20 of the present disclosure, wherein example 20 also includes the subject matter according to any one of examples 18-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIG. 13 is a chart listing materials and fiber angles of plies of a composite panel and patch, according to one or more examples of the present disclosure;

FIG. 14 is a chart listing materials and fiber angles of plies of another composite panel and patch, according to one or more examples of the present disclosure;

and

Figure 15:
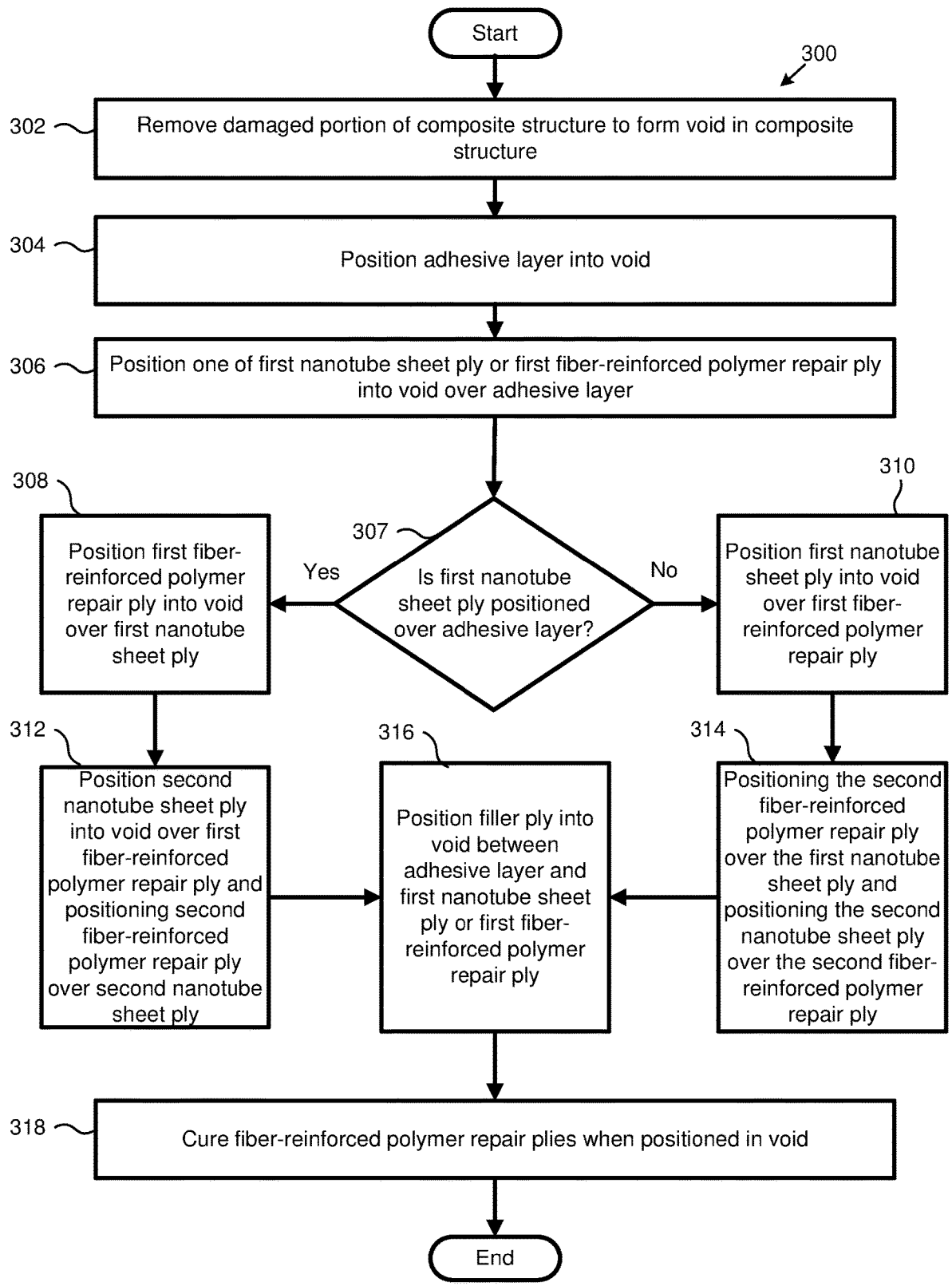

FIG. 15 is a schematic flow chart of a method of repairing a composite structure, according to one or more examples of the present disclosure.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
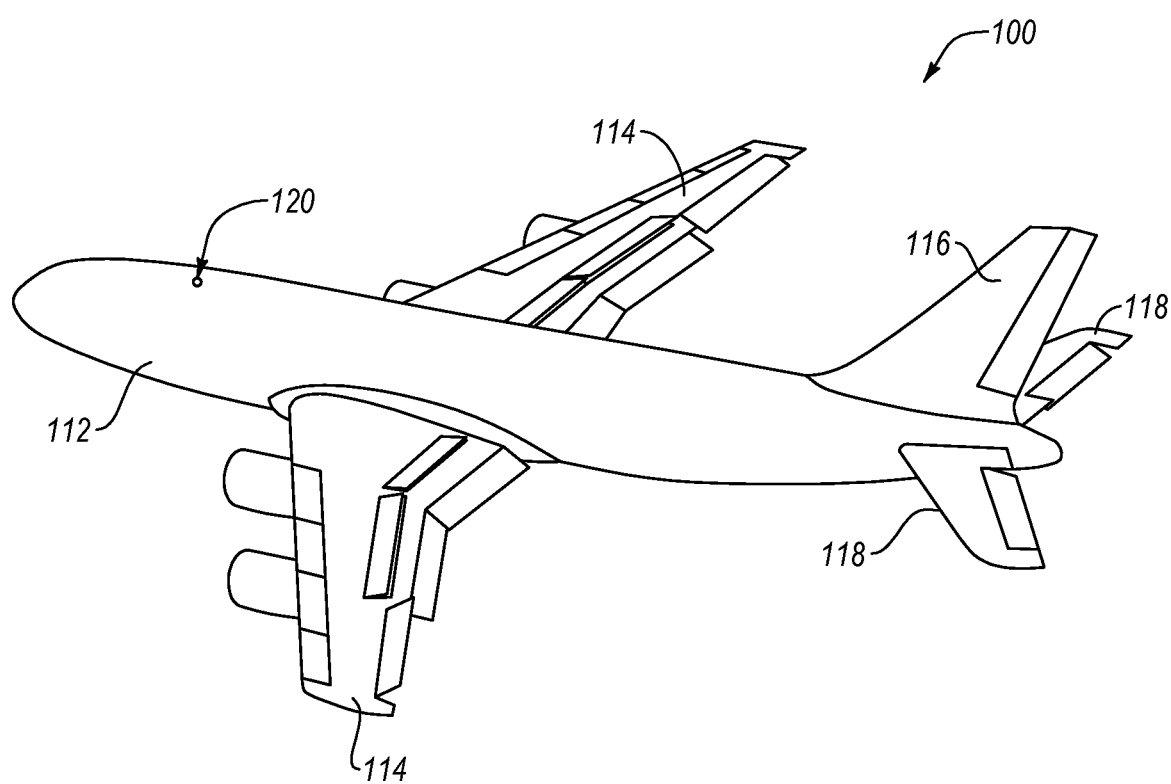
FIG. 1 is a perspective view of an aircraft with a repair site, according to one or more examples of the present disclosure.
Figure 2:
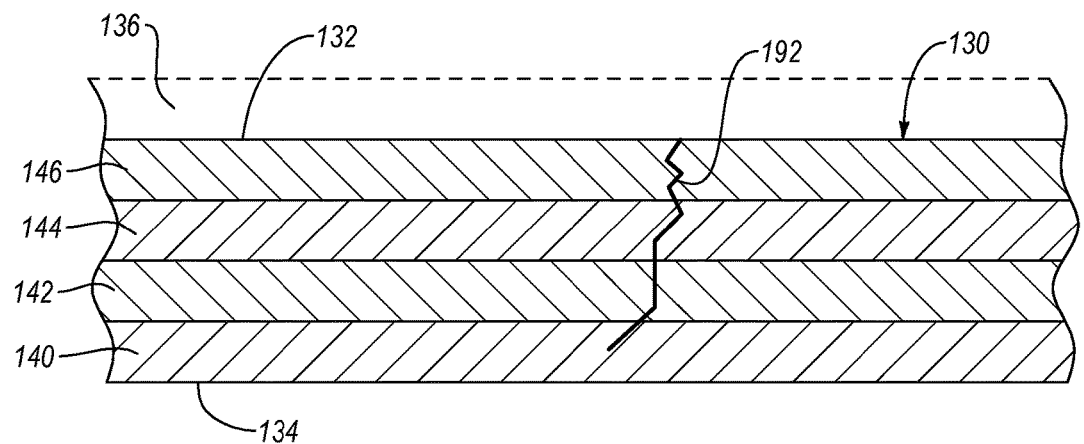
FIG. 2 is a cross-sectional side view of a composite panel with a structural abnormality, according to one or more examples of the present disclosure.

Referring to FIG. 1, one embodiment of an aircraft 100 is shown. The aircraft 100 can be any of various types of aircraft, such as commercial aircraft used for the transportation of passengers, military aircraft for military operations, personal aircraft, fighter jets, and the like. Moreover, although an aircraft is depicted in the illustrated embodiments, in other embodiments, another structure, such as a vehicle (e.g., helicopter, boat, spacecraft, automobile, etc.) or non-mobile complex structure (e.g., building, bridge, machinery, etc.), having a composite structure, can be used instead of the aircraft 100.

The depicted aircraft 100 includes a body 112 (e.g., fuselage), a pair of wings 114 coupled to and extending from the body 112, a vertical stabilizer 116 coupled to the body 112, and a pair of horizontal stabilizers 118 coupled to the body 112 and/or the vertical stabilizer 116. As depicted, the aircraft 100 represents a passenger airplane. Any of various parts of the aircraft 100 include a composite structure. For example, the body 112 of the aircraft 100 includes a composite panel 130 that forms a skin of the body 112 of the aircraft 100. Like the body 112, the wings 114, the vertical stabilizer 116, and the horizontal stabilizers 118 can include a composite structure, such as the composite panel 130 shown in FIG. 3.

The composite panel 130 includes multiple fiber-reinforced polymer plies. In the illustrated embodiment, the composite panel 130 includes a first fiber-reinforced polymer ply 140, a second fiber-reinforced polymer ply 142, a third fiber-reinforced polymer ply 144, and a fourth fiber-reinforced polymer ply 146. The fiber-reinforced polymer plies of the composite panel 130 are laid up in a stacked formation. Generally, each fiber-reinforced polymer ply of the composite panel 130 includes unidirectional fibers embedded within a polymer resin. The unidirectional fibers can be any of various fibers, such as carbon fibers, glass fibers, and the like. Each fiber of the unidirectional fibers is between about 5-20 micrometers in diameter and has a length-to-diameter aspect ratio that, while length dependent, is conventionally greater than 10,000:1. In some implementations, each unidirectional fiber has a diameter at least equal to or greater than 1 micrometer. Moreover, each fiber of the unidirectional fibers has a planar or sheet-like atomic structure. The polymer resin can be any of various thermoset polymer resins or epoxies known in the art. The unidirectional fibers are embedded in the polymer resin when the polymer resin is in a pre-cured state. In the pre-cured state, the polymer resin is relatively soft, pliable, and flexible. As the polymer resin is cured, by heating the polymer resin to a cure temperature of the polymer resin, the polymer resin becomes hard and stiff. After heating the polymer resin and well before reaching the cure temperature, a viscosity of the polymer resin decreases and the polymer resin becomes flowable.

For a given fiber-reinforced polymer ply, the fibers are unidirectional because each fiber is lengthwise parallel to a given direction. The direction of the unidirectional fibers of a fiber-reinforced polymer ply is dependent on the orientation of the fiber-reinforced polymer ply in the composite panel 130. To promote strength in multiple directions, the fiber-reinforced polymer plies of the composite panel 130 are oriented relative to each other such that the unidirectional fibers of one fiber-reinforced polymer ply are parallel to a direction that is different than the unidirectional fibers of any directly adjacent fiber-reinforced polymer ply.

For example, the relative orientations of the unidirectional fibers of the fiber-reinforced polymer plies of the composite panel 130 for two embodiments are depicted in chart 200 of FIG. 13 and chart 202 of FIG. 14. According to the chart 200 and the chart 202, the first fiber-reinforced polymer ply 140 (represented by Ply 1) is made of a fiber-reinforced polymer composite material and has a fiber angle A, the second fiber-reinforced polymer ply 142 (represented by Ply 2) is made of a fiber-reinforced polymer composite material and has a fiber angle B, the third fiber-reinforced polymer ply 144 (represented by Ply 3) is made of a fiber-reinforced polymer composite material and has the fiber angle A, and the fourth fiber-reinforced polymer ply 146 (represented by Ply 4) is made of a fiber-reinforced polymer composite material and has a fiber angle B or fiber angle C. The fiber angle A is ±45°, the fiber angle B is 90°, and the fiber angle C is 0° is some embodiments. Accordingly, in the illustrated embodiment, the unidirectional fibers of the first fiber-reinforced polymer ply 140 have the same fiber angle as the unidirectional fibers of the third fiber-reinforced polymer ply 144. Also, in some implementations, the unidirectional fibers of the second fiber-reinforced polymer ply 142 have the same fiber angle as the unidirectional fibers of the fourth fiber-reinforced polymer ply 146. In other embodiments, the fiber angle A, the fiber angle B, and the fiber angle C can be have any of various other values as long as the fiber angle A is different from the fiber angle B and fiber angle C. As used herein a fiber angle and fiber direction can be used interchangeably.

The fiber-reinforced polymer plies of the composite panel 130 are in a cured state. Prior to curing the fiber-reinforced polymer plies together, the plies are stacked together in desired orientations relative to each other to produce desired fiber angles, such as those depicted in FIGS. 13 and 14. After the fiber-reinforced polymer plies are in the desired orientations, the plies are heated to the curing temperature of the plies to cure the plies and effectively bond the plies together. In some implementations, one or more additional plies or layers 136, such as a paint layer, a sealant layer, a protective coating, etc., are deposited onto an outer surface 132 of the composite panel 130.

Any of the composite structures may have an abnormality, such as a crack, that develops over time and continued use of the aircraft 100. As an example, the composite panel 130 includes a crack 192. As shown, the crack 192 propagates through multiple plies of the composite panel 130. To eliminate the crack 192 and ensure safe and continued use of the composite panel 130, the composite panel 130 can be repaired using a scarf repair method, such as method 300 of FIG. 15. Initially, at step 302, the scarf repair method 300 includes removing a damaged portion of the composite panel 130 to form a void 150 in the composite panel 130. The void 150 formed in the composite panel 130 extends from the outer surface 132 of the composite panel 130 to an inner surface 134 of the composite panel 130. Accordingly, the void 150 can be considered a through-void because it extends entirely through the composite panel 130. However, in other embodiments, the void 150 is not a through-void and extends from the outer surface 132 of the composite panel 130 to a location within the composite panel 130 outward of the inner surface 134.

The side or surface 152 of the composite panel 130 defining the void 150 is tapered to define an angle $\theta$ with the outer surface 132 and inner surface 134 of the composite panel 130. The tapering of the surface 152 of the composite panel 130 defining the void 150 results in a convergence of the surface 152 in a direction extending from the outer surface 132 to the inner surface 134. The void 150 is tapered to promote bonding between the composite panel 130 and a patch 160 (see, e.g., FIG. 5) inserted into the void 150 and to improve load distribution between the composite panel 130 and the patch 160. Additionally, the void 150 is tapered to promote the restoration of the structural integrity of the composite panel 130. However, the stronger the plies of the patch 160, as will be explained in more detail below, the smaller the taper needed to restore the structural integrity of the composite panel 130. For example, conventional scarf repair processes for repairing composite structures may use a void with a length-to-depth taper ratio of between 28:1 and 32:1. But, because of the improved strength of the patch 160 compared to conventional patches, the void 150, dimensionally defined by a length (L) and a depth (D), has a length-to-depth taper ratio of between 15:1 and 20:1 (see, e.g., FIG. 3). Additionally, the smaller taper of the void 150, the smaller the taper of the patch 160, which results in less material removed from the composite panel 130, promoting structural integrity of the composite panel 130 by keeping more of the composite panel 130 intact, and results in less material in the patch 160, promoting a decrease in material costs.

Figure 3:
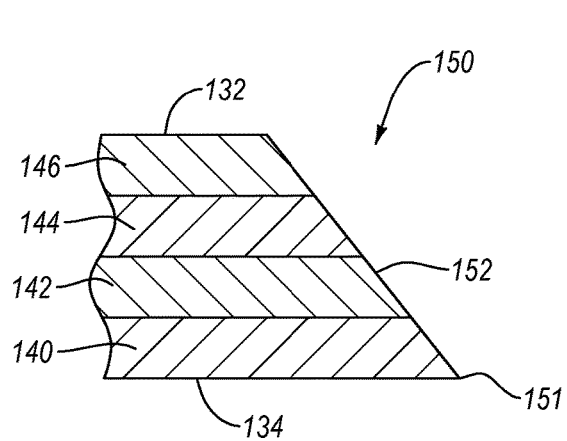
FIG. 3 is a cross-sectional side view of the composite panel of FIG. 2, shown with the abnormality removed and a void formed in the composite panel, according to one or more examples of the present disclosure.
Figure 3:
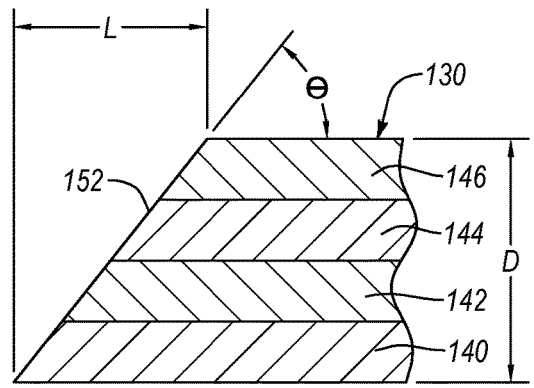
Figure 5:
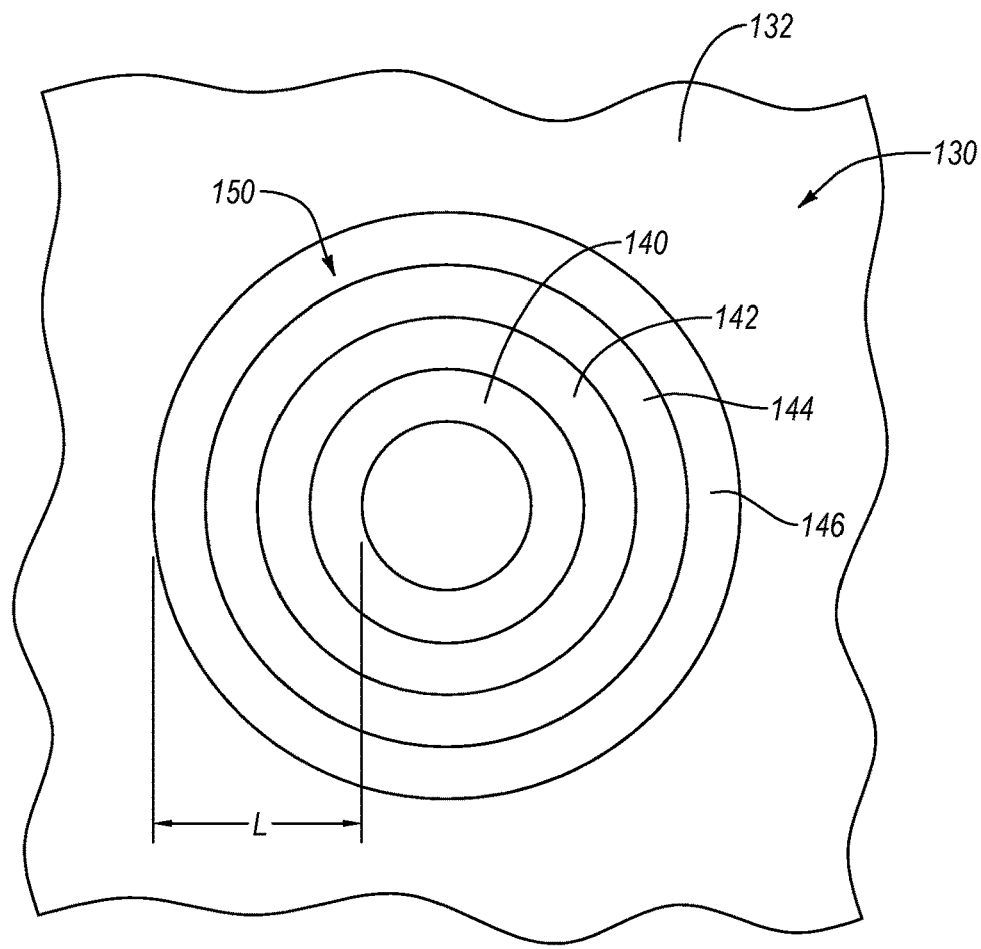
FIG. 5 is a top plan view of the composite panel of FIG. 3, according to one or more examples of the present disclosure.

Referring to FIGS. 3 and 5, the void 150 has a conical frustum or frusto-conical shape. Accordingly, the void 150 is circular in cross-section along planes parallel to the outer surface 132 and the inner surface 134 of the composite panel 130. Because the void 150 is tapered or converges, tapered edges of each of the fiber-reinforced polymer plies of the composite panel 130 are exposed and viewable in a top plan view. Each exposed tapered edge of the fiber-reinforced polymer plies of the composite panel 130 defining the void 150 has a width greater than a thickness of the corresponding fiber-reinforced polymer ply.

Figure 4:
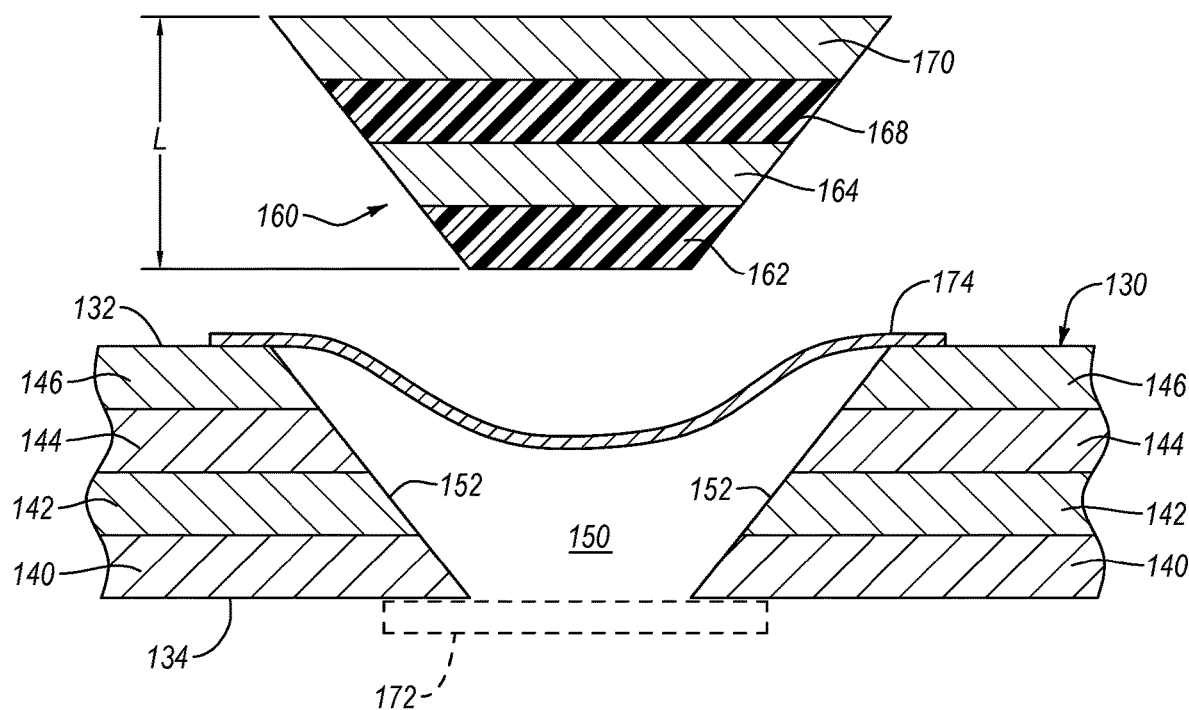
FIG. 4 is a cross-sectional side view of the composite panel of FIG. 3, shown with a repair patch outside the void, according to one or more examples of the present disclosure.

Referring to FIGS. 4 and 15, at step 304 of the scarf repair method 300 an adhesive layer 174 is positioned over or into the void 150. More specifically, the adhesive layer 174 overlays the exposed edges of the fiber-reinforced polymer plies of the composite panel 130 defining the void 150. In this position, the adhesive layer 174 is interposed between the composite panel 130 and the patch 160 when the patch 160 is positioned within the void 150. The adhesive layer 174 promotes secure fixed engagement between the patch 160 and the composite panel 130, as well as provides a medium for load distribution between the composite panel 130 and the patch 160.

Generally, the adhesive layer 174 is a flexible film adhesive sheet made of any of various adhesive materials, such as epoxy. The adhesive material of the adhesive layer 174 can be a pre-cured thermoset material, which can be cured to activate the adhesive, or a thermoplastic material, such as a pressure-sensitive or heat-activated adhesive. In one implementation, the adhesive layer 174 is positioned in the void 150 prior to the patch 160 being positioned in the void 150. However, in another implementation, the adhesive layer 174 is coupled to the patch 160 prior to the patch 160 being positioned in the void 150. In this latter implementation, the patch 160 together with the adhesive layer 174 are positioned in the void 150 at the same time. The adhesive layer 174 has a surface area large enough to entirely cover the exposed edges of the fiber-reinforced polymer plies of the composite panel 130 defining the void 150. In some implementations, the surface area of the adhesive layer 174 is large enough to entirely cover the exposed edges of the fiber-reinforced polymer plies and overlap a portion of the outer surface 132 around the void 150. The overlapping portion can be removed after curing the patch 160 as will be described in more detail below.

Referring again to FIGS. 4, 11, and 15, the scarf repair method 300 includes positioning the patch 160 into the void 150 over the adhesive layer 174 such that the adhesive layer 174 is between the patch 160 and the exposed edges of the fiber-reinforced polymer plies of the composite panel 130 defining the void 150. The patch 160 includes at least a first nanotube sheet ply 162 and a first fiber-reinforced polymer repair ply 164. More specifically, the method 300 includes positioning one of the first nanotube sheet ply 162 or the first fiber-reinforced polymer repair ply 164 into the void 150 over the adhesive layer 174 at step 306. As determined at step 307, when the first nanotube sheet ply 162 is positioned into the void 150 over the adhesive layer 174 at step 306, the method 300 includes positioning the first fiber-reinforced polymer repair ply 164 into the void 150 over the first nanotube sheet ply 162 at step 308. However, as determined at step 307, when the first fiber-reinforced polymer repair ply 164, rather than the nanotube sheet ply 162, is positioned into the void 150 over the adhesive layer 174 at step 306, the method 300 includes positioning the first nanotube sheet ply 162 into the void 150 over the first fiber-reinforced polymer repair ply 164 at step 310. As defined herein, the term "over" can mean directly adjacent or indirectly adjacent with no intervening nanotube sheet plies or fiber-reinforced polymer repair plies. Accordingly, a first nanotube sheet ply is over a first fiber-reinforced polymer repair ply even if a resin layer is between the first nanotube sheet ply and the first fiber-reinforced polymer repair ply, as long as no other nanotube sheet ply or fiber-reinforced polymer repair ply is between the first nanotube sheet ply and the first fiber-reinforced polymer repair ply. Additionally, a first element being over a second element does not require that the first element is above (in the vertical direction) of the second element as the first and second elements may be flipped or rotated and the first element may still be over the second element.

The method 300 forms a repair site 120 (see, e.g., FIG. 1) in the composite panel 130. In one implementation, the repair site 120 includes a scarf joint. The repair site 120 includes at least the void 150, the patch 160, and the adhesive layer 174. The first nanotube sheet ply 162 and the first fiber-reinforced polymer repair ply 164 are positioned together into the void 150 in some implementations. In other words, in some implementations, the first nanotube sheet ply 162 and the first fiber-reinforced polymer repair ply 164 are combined to form the patch 160 outside the void 150 before positioning the entire patch 160 into the void 150 at one time. However, in other implementations, the first nanotube sheet ply 162 and the first fiber-reinforced polymer repair ply 164 are separately positioned into the void 150 at different times, such that the patch 160 is formed within the void 150.

The method 300 accommodates different ordering of the first nanotube sheet ply 162 and the first fiber-reinforced polymer repair ply 164 within the void 150. For example, according to step 306 of the method 300, the first nanotube sheet ply 162 is first into the void 150 and the first fiber-reinforced polymer repair ply 164 is second into the void 150 (see, e.g., FIG. 10). In an alternative example, according to step 308 of the method 300, the first fiber-reinforced polymer repair ply 164 is first into the void 150 and the first nanotube sheet ply 162 is second into the void 150 (see, e.g., FIG. 11).

The first nanotube sheet ply 162 includes multi-directional nanotubes grouped together to form a sheet. The first nanotube sheet ply 162 has the same thickness as that of a corresponding one of the fiber-reinforced polymer plies of the composite panel 130. Generally, a nanotube has a cylindrical nanostructure with a relatively high length-to-diameter ratio, such as around 1,000:1. In some implementations, each nanotube has a diameter equal to or less than 100 nanometers. Each nanotube has a higher elastic modulus than any one of the unidirectional fibers of the fiber-reinforced polymer plies.

The nanotubes of the first nanotube sheet ply 162 can be single-walled, double-walled, or multi-walled nanotubes. According to some embodiments, the nanotubes are carbon nanotubes. Carbon nanotubes have a fullerene structure. For example each carbon nanotube may be a long, hollow structure with walls formed of one-atom-thick sheets of carbon or graphene rolled into a cylindrical or tubular shape. Generally, the nanotubes can be formed on a substrate using any of various deposition techniques, such as vapor deposition. Such techniques, particularly vapor deposition techniques, promote the formation of a large number of uniformly configured, but multi-oriented, nanotubes. In one implementation, the nanotubes of the first nanotube sheet ply 162 are formed separately and mixed/intermangled together randomize the orientation of the nanotubes. The nanotubes may be packed together such that the nanotubes themselves provide structure to the first nanotube sheet ply 162. In one implementation, a nanotube sheet ply is made by mixing nanotubes with water to form a nanotube mixture. The nanotube mixture is poured onto a cloth and then passed through heating rolls to form the final nanotube sheet ply on the cloth.

The atoms forming the nanotubes, particularly carbon nanotubes, are chemically bonded together with so-called $sp^2$ bonds, which are extremely strong (e.g., tensile strength) compared to other types of chemical bonds. Accordingly, the nanotubes exhibit superior strength and durability. Additionally, the nanotubes have a relatively low coefficient of thermal expansion (CTE). Although carbon nanotubes have been described above, the nanotubes can be other types of nanotubes, such as boron-carbon-nitrogen (BCN) nanotubes, gallium nitride nanotubes, silicon nanotubes, and the like. In certain applications, each individual nanotube may be doped with an inert gas, such as nitrogen, argon, or boron to alter the properties of the nanotube. According to some manufacturing techniques, doping the nanotubes with an inert gas assists with the formation of sheets of material into a tubular configuration.

Each nanotube, and thus the first nanotube sheet ply 162, is electrically semi-conductive. In other words, each nanotube is capable of conducting an electrical charge. The electrical conductivity of the first nanotube sheet ply 162 is dependent on the spacing between adjacent nanotubes of the first nanotube sheet ply 162.

Additionally, the first nanotube sheet ply 162 is fiberless. In other words, the first nanotube sheet ply 162 does not include fibers, such as those in the fiber-reinforced polymer plies of the composite panel 130 and the first fiber-reinforced polymer repair ply 164. Accordingly, other than a resin or epoxy matrix in some implementations, the first nanotube sheet ply 162 is formed purely of nanotubes. According to one example, the first nanotube sheet ply 162 is impregnated with a resin or epoxy matrix prior to being positioned within the void 150. However, as will be described, the first nanotube sheet ply 162 has no resin or epoxy matrix prior to being positioned within the void, but has a resin or epoxy matrix added to the first nanotube sheet ply 162 after and while being positioned within the void 150.

The first fiber-reinforced polymer repair ply 164 is similar to the fiber-reinforced polymer plies of the composite panel 130. More specifically, the first fiber-reinforced polymer repair ply 164 includes unidirectional fibers embedded within a polymer resin or epoxy. As defined herein, resin and epoxy are used interchangeably. The first fiber-reinforced polymer repair ply 164 has the same thickness as that of a corresponding one of the fiber-reinforced polymer plies of the composite panel 130. In some implementations, the first nanotube sheet ply 162 and the fiber-reinforced polymer repair ply 164 have the same thickness.

The patch 160 has been heretofore described as having a first nanotube sheet ply 162 and a first fiber-reinforced polymer repair ply 164. However, in some embodiments, the patch 160 has more than one nanotube sheet ply and more than one fiber-reinforced polymer repair ply. In fact, the patch 160 can have any number of nanotube sheet plies and at least a corresponding number of fiber-reinforced polymer repair plies as long as the nanotube sheet plies and the fiber-reinforced polymer repair plies alternate in a stacked formation. Generally, the number of nanotube sheet plies and fiber-reinforced polymer repair plies of the patch 160 corresponds with the number of fiber-reinforced polymer plies of the composite panel 130. For example, when the void 150 extends entirely through the composite panel 130, the combined number of nanotube sheet plies and fiber-reinforced polymer repair plies of the patch 160 equals the number of fiber-reinforced polymer plies of the composite panel 130. However, when the void 150 does not extend entirely through the composite panel 130, the combined number of nanotube sheet plies and fiber-reinforced polymer repair plies of the patch 160 equals the number of fiber-reinforced polymer plies exposed by the void 150.

According to one embodiment where the composite panel 130 has at least four fiber-reinforced polymer plies, such as shown, the patch 160 includes at least one additional nanotube sheet and at least one additional fiber-reinforced polymer repair ply. Accordingly, the scarf repair method 300 may also include positioning a second nanotube sheet ply 168 and a second fiber-reinforced polymer repair ply 170 into the void 150. The second nanotube sheet ply 168 is similar to the first nanotube sheet ply 162, and the second fiber-reinforced polymer repair ply 170 is similar to the first fiber-reinforced polymer repair ply 164.

The order of entry of the second nanotube sheet ply 168 and the second fiber-reinforced polymer repair ply 170 into the void 150, and thus order of the plies within the void 150, is based on the order of entry of the first nanotube sheet ply 162 and a second fiber-reinforced polymer repair ply 164 into the void 150. Generally, the second nanotube sheet ply 168 and the second fiber-reinforced polymer repair ply 170 follow the same ordering pattern as the first nanotube sheet ply 162 and the second fiber-reinforced polymer repair ply 164. For example, in one implementation, when the first fiber-reinforced polymer repair ply 164 is positioned over the first nanotube sheet ply 162 at step 308, the method 300 further includes positioning the second nanotube sheet ply 168 into the void 150 over the first fiber-reinforced polymer repair ply 164 and positioning the second fiber-reinforced polymer repair ply 170 over the second nanotube sheet ply 168 at step 312. In an alternative example, in one implementation, when the first nanotube sheet ply 162 is positioned over the first fiber-reinforced polymer repair ply 164, the method 300 further includes positioning the second fiber-reinforced polymer repair ply 370 over the first nanotube sheet ply 362 and positioning the second nanotube sheet ply 368 over the second fiber-reinforced polymer repair ply 370 at step 314.

Figure 6:
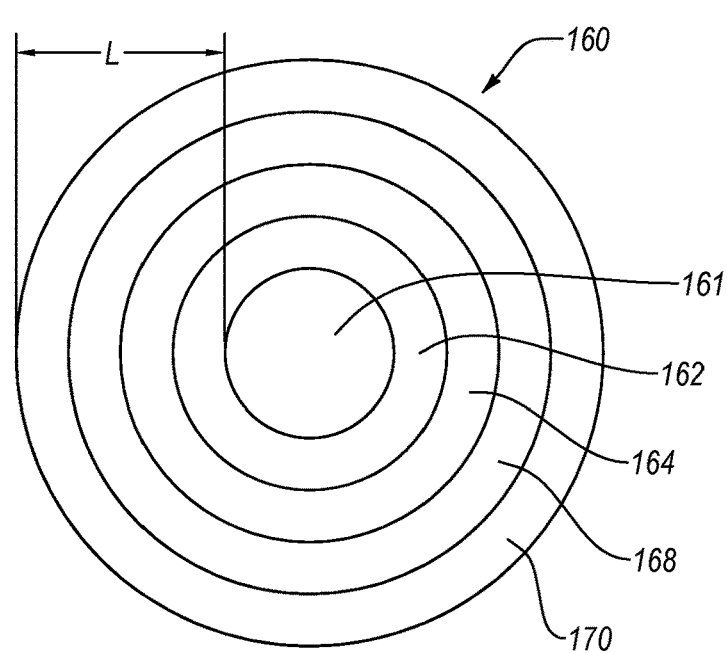
FIG. 6 is a bottom plan view of the repair patch of FIG. 4, according to one or more examples of the present disclosure.
Figure 11:
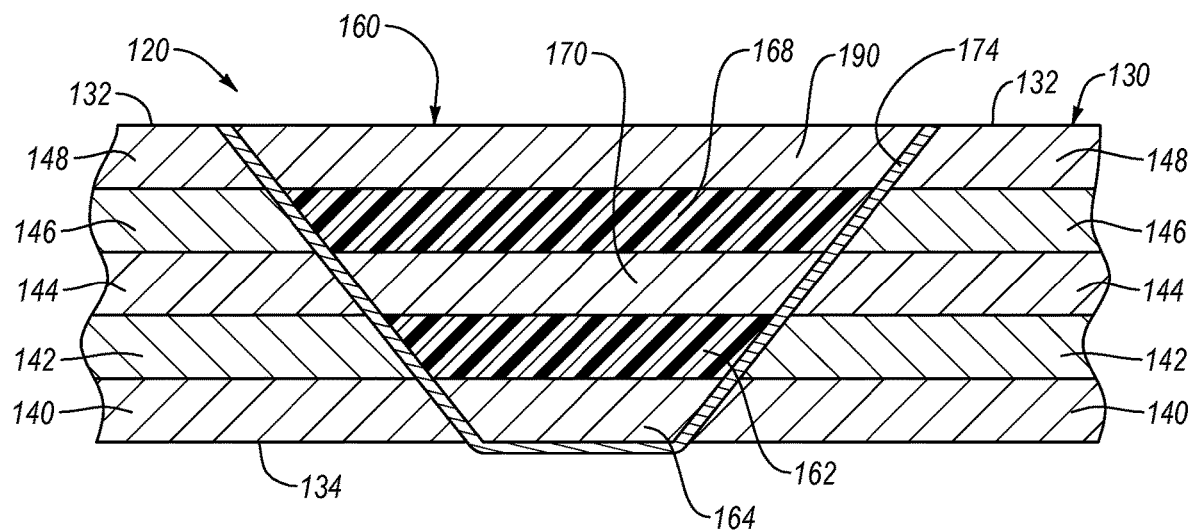
FIG. 11 is a cross-sectional side view of another repair site formed in the composite panel of FIG. 3, according to one or more examples of the present disclosure.

Referring to FIGS. 4 and 6, the patch 160 has a conical frustum or frusto-conical shape corresponding with the frusto-conical shape of the void 150. Generally, the patch 160 is sized to nestably engage the composite panel 130, via the adhesive layer 174, when positioned within the void 150. Accordingly, the patch 160 is circular in cross-section along planes parallel to the outer surface 132 and the inner surface 134 of the composite panel 130 when the patch 160 is positioned within the void 150. Each exposed tapered edge of the plies of the patch 160 has a width greater than a thickness of the respective ply. Due to the conical and tapered nature of the patch 160, the diameters of the plies of the patch 160 decrease in the direction of the taper. Accordingly, the closer the ply of the patch 160 to the opening 151 of the void 150, the smaller the diameter of the ply and vice versa. For example, as shown in FIG. 4, the first fiber-reinforced polymer repair ply 164 has a diameter greater than a diameter of the first nanotube sheet ply 162. More specifically, a maximum diameter of the first fiber-reinforced polymer repair ply 164 is greater than a maximum diameter of the first nanotube sheet ply 162. However, a minimum diameter of the first fiber-reinforced polymer repair ply 164 is equal to the maximum diameter of the first nanotube sheet ply 162. As another example, as shown in FIG. 11, the first nanotube sheet ply 162 has a diameter greater than a diameter of the first fiber-reinforced polymer repair ply 164. More specifically, a maximum diameter of the first nanotube sheet ply 162 is greater than a maximum diameter of the first fiber-reinforced polymer repair ply 164. However, a minimum diameter of the first nanotube sheet ply 162 is equal to the maximum diameter of the first fiber-reinforced polymer repair ply 164.

The scarf repair method 300 also includes orienting (e.g., rotating) the fiber-reinforced polymer repair plies of the patch 160 relative to the nanotube sheet plies of the patch 160, and orienting the patch 160 within the void 150 or before placement in the void 150, such that the orientation of the unidirectional fibers of the fiber-reinforced polymer repair plies of the patch 160 are parallel to the unidirectional fibers of the corresponding co-planar fiber-reinforced polymer plies of the composite panel 130. For example, the relative orientations of the unidirectional fibers of the fiber-reinforced polymer repair plies of the patch 160 for two embodiments are depicted in chart 200 of FIG. 13 and chart 202 of FIG. 14. According to the embodiment represented by chart 200, the unidirectional fibers of the first fiber-reinforced polymer repair ply 164 (represented by Ply 2) has a fiber angle B to match the fiber angle B of the unidirectional fibers of Ply 2 of the composite panel 130. Additionally, according to chart 200, the unidirectional fibers of the second fiber-reinforced polymer repair ply 170 (represented by Ply 4) has a fiber angle B or fiber angle C to match the fiber angle B or fiber angle C of the unidirectional fibers of Ply 4 of the composite panel 130. In contrast, according to the embodiment represented by chart 202, the unidirectional fibers of the first fiber-reinforced polymer repair ply 164 (represented by Ply 1) has a fiber angle A to match the fiber angle A of the unidirectional fibers of Ply 1 of the composite panel 130. Additionally, according to chart 202, the unidirectional fibers of the second fiber-reinforced polymer repair ply 170 (represented by Ply 3) has a fiber angle A to match the fiber angle A of the unidirectional fibers of Ply 3 of the composite panel 130. Additionally, in some implementations, where nanotube sheet plies of the patch 160 should be covered with fiber-reinforced polymer repair plies, as shown in FIG. 11, the patch 160 may include an additional fiber-reinforced polymer repair ply 190 that covers the second nanotube sheet ply 168. The fiber-reinforced polymer repair ply 190 is shown to be co-planar with a fifth fiber-reinforced polymer ply 148 of the composite panel 130.

Because the nanotubes of the nanotube sheet plies of the patch 160 are multi-directional and intermangled, they do not align with the unidirectional fibers of the corresponding co-planar fiber-reinforced polymer plies of the composite panel 130. Furthermore, due to the strength and load distribution capabilities of the nanotube sheet plies added to the patch 160, the non-alignment of the nanotubes and the unidirectional fibers of the fiber-reinforced polymer plies of the composite panel 130 need not be aligned for proper load distribution between the nanotube sheet plies of the patch 160 and the fiber-reinforced polymer plies of the composite panel 130. Accordingly, not all of the plies of the patch 160 need to be oriented for fiber alignment with the fiber-reinforced polymer plies of the composite panel 130, which simplifies the scarf repair method 300 compared to conventional methods where the fibers of all plies are properly aligned with the fibers of the composite panel 130.

In some embodiments, the scarf repair method 300 includes positioning a backup layer 172 under the opening 151 in the inner surface 134 of the composite panel 130. The backup layer 172 can be positioned to abut the inner surface 134 while effectively covering the opening 151. The backup layer 172 helps to maintain the first ply into the void 150 in place within the void 150 during the scarf repair method. In some implementations, the backup layer 172 is removed following the scarf repair method. The backup layer 172 is made of a fiber-reinforced polymer material, in some implementations, and can be secured in place relative to the inner surface 134 by any of various coupling techniques, such as adhesives, bonding, and the like.

Figure 7:
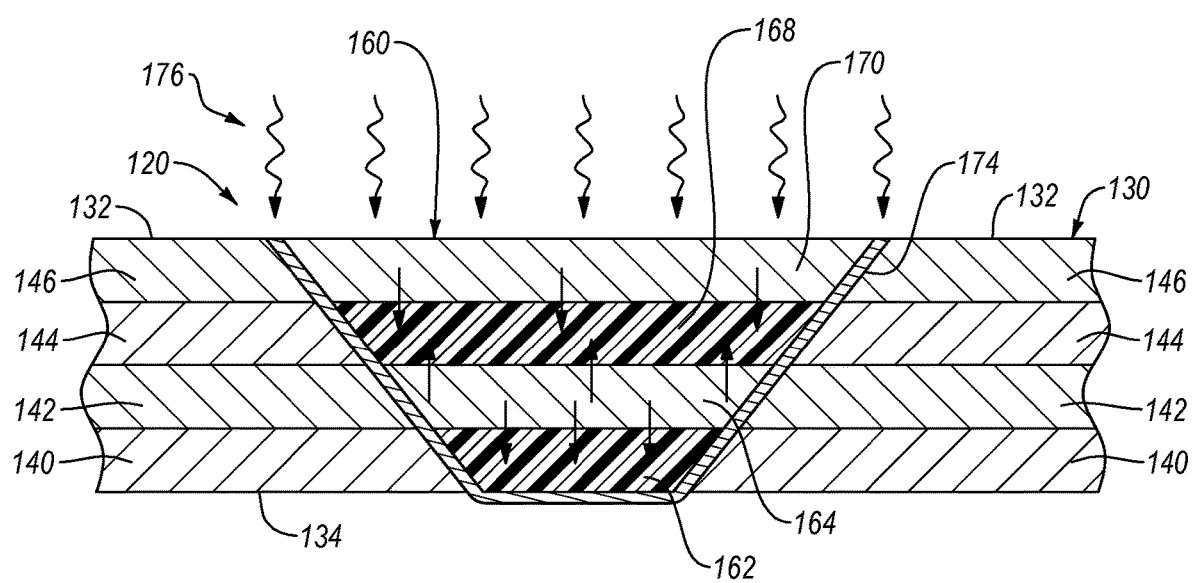
FIG. 7 is a cross-sectional side view of the composite panel of FIG. 3, shown with the repair patch in the void and undergoing a curing process, according to one or more examples of the present disclosure.

Referring now to FIG. 7, with the patch 160 positioned in the void 150 and the adhesive layer 174 within the void between the patch 160 and the composite panel 130, the scarf repair method 300 further includes curing the first fiber-reinforced polymer repair ply 164 at 318. Of course, if the patch 160 has a second fiber-reinforced polymer repair ply 170 or other additional fiber-reinforced polymer repair plies, these plies are also cured at step 318. Curing includes applying heat 176 to the patch 160 to increase the temperature of the fiber-reinforced polymer repair plies of patch 160 to a cure temperature of the resin of the fiber-reinforced polymer repair plies. At the cure temperature, the resin sets and becomes hard and rigid. Due to the random distribution of nanotubes in the nanotube sheet plies of the patch 160, the distribution of temperature within the patch 160 is more uniform. In some implementations, in addition to the application of the heat 176, curing at 318 may also include the application of a compressive pressure to the patch 160, such as via a vacuum pressurization process.

As the temperature of the resin of the fiber-reinforced polymer repair plies of the patch 160 increases, but before reaching the cure temperature, the resin transitions into a flowable state. Accordingly, curing at 318 of the method 300 may include flowing a portion of the resin of the fiber-reinforced polymer repair plies of the patch 160 into the nanotube sheet plies of the patch 160 as indicated by arrows in FIG. 7. Additionally, in certain implementations, the adhesive material of the adhesive layer 174 may also flow into the nanotube sheet plies to help impregnate the nanotube sheet plies. Further heating of the patch 160 to at or above the cure temperature of the resin then cures the resin that has flowed into the nanotube sheets. In this manner, the nanotube sheet plies are impregnated with the resin of the fiber-reinforced polymer repair plies while in situ within the void 150. Accordingly, the inconvenience and cost that would be associated with storage and handling of pre-impregnated nanotube sheet plies is eliminated. Resin from only one adjacent fiber-reinforced polymer repair ply may flow into a given nanotube sheet ply, in one implementation, and from two adjacent fiber-reinforced polymer repair plies (as shown), in other implementations.

Figure 8:
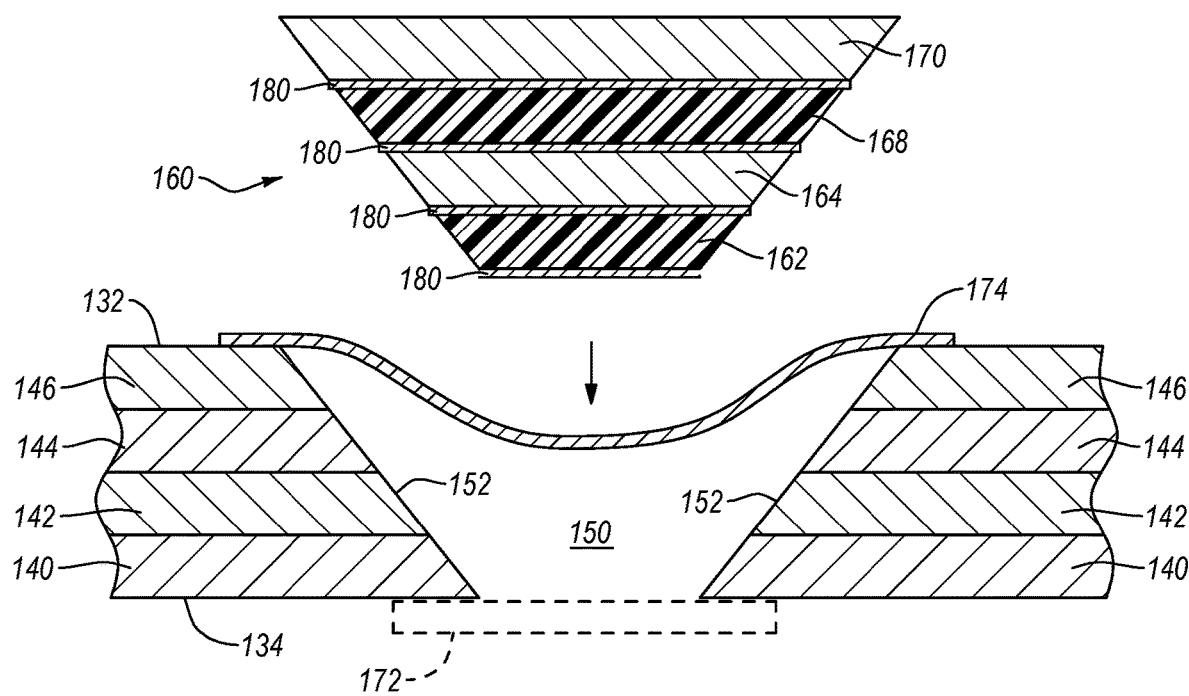
FIG. 8 is a cross-sectional side view of the composite panel of FIG. 3, shown with another repair patch outside the void, according to one or more examples of the present disclosure.

According to one embodiment, the nanotube sheet plies of the patch 160 are impregnated with the resin of the fiber-reinforced polymer repair plies while in situ within the void 150 in a different manner. For example, referring to FIGS. 8 and 9, resin from one or more resin layers 180, forming a part of the patch 160 prior to curing the patch 160, flows into the nanotube sheet plies of the patch 160 while the patch 160 is cured at step 318 of the scarf repair method 300. In some implementations, the resin of the resin layers 180 is different than the resin of the fiber-reinforced polymer repair plies of the patch 160.

Figure 9:
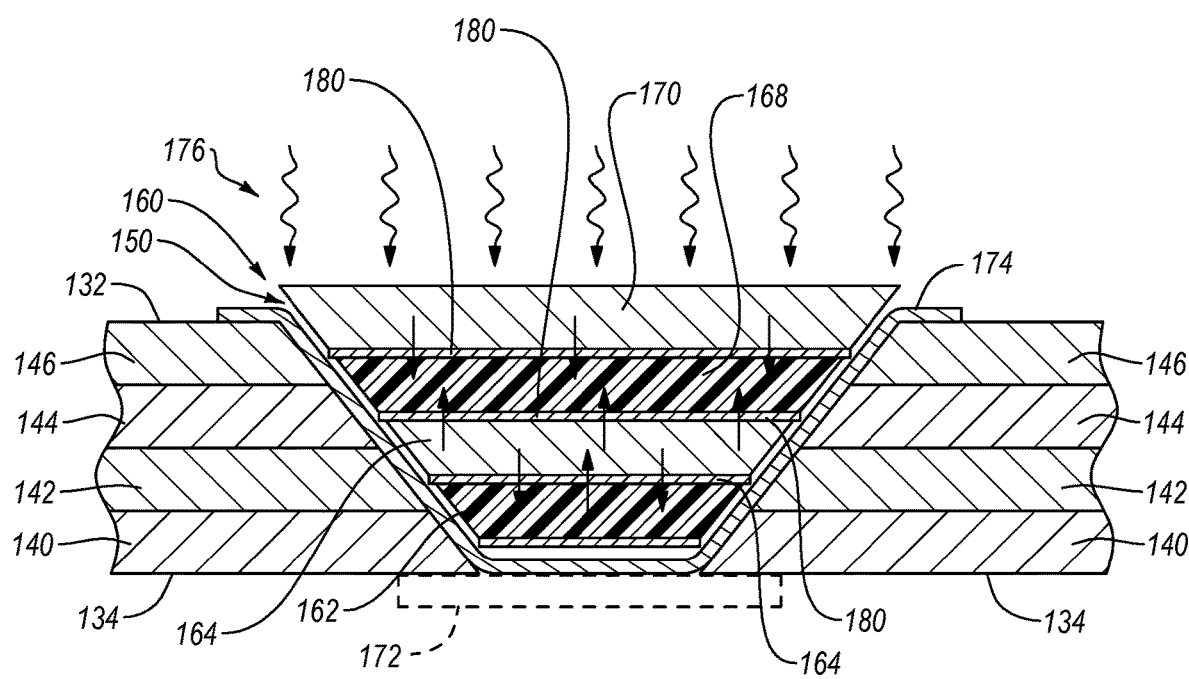
FIG. 9 is a cross-sectional side view of the composite panel of FIG. 3, shown with the repair patch of FIG. 8 in the void and undergoing a curing process, according to one or more examples of the present disclosure.

The resin layers 180 are sandwiched between the plies of the patch 160. In the illustrated embodiment, at least one resin layer 180 is sandwiched between all adjacent plies of the patch 160. For example, one resin layer 180 is sandwiched between the adhesive layer 174 and the first nanotube sheet ply 162, one resin layer 180 is sandwiched between the first nanotube sheet ply 162 and the first fiber-reinforced polymer repair ply 164, one resin layer 180 is sandwiched between the first fiber-reinforced polymer repair ply 164 and the second nanotube sheet ply 168, and one resin layer 180 is sandwiched between the second nanotube sheet ply 168 and the second fiber-reinforced polymer repair ply 170. However, in other embodiments, there is one resin layer 180 per nanotube sheet ply in the patch 160. As shown in FIG. 9, as the patch 160 is heated with heat 176 during the curing process, resin from one or two resin layers 180 flow into a given nanotube sheet ply to impregnate the nanotube sheet ply with resin.

Further heating of the patch 160 to at or above the cure temperature of the resin then cures the resin that has flowed into the nanotube sheets.

Figure 10:
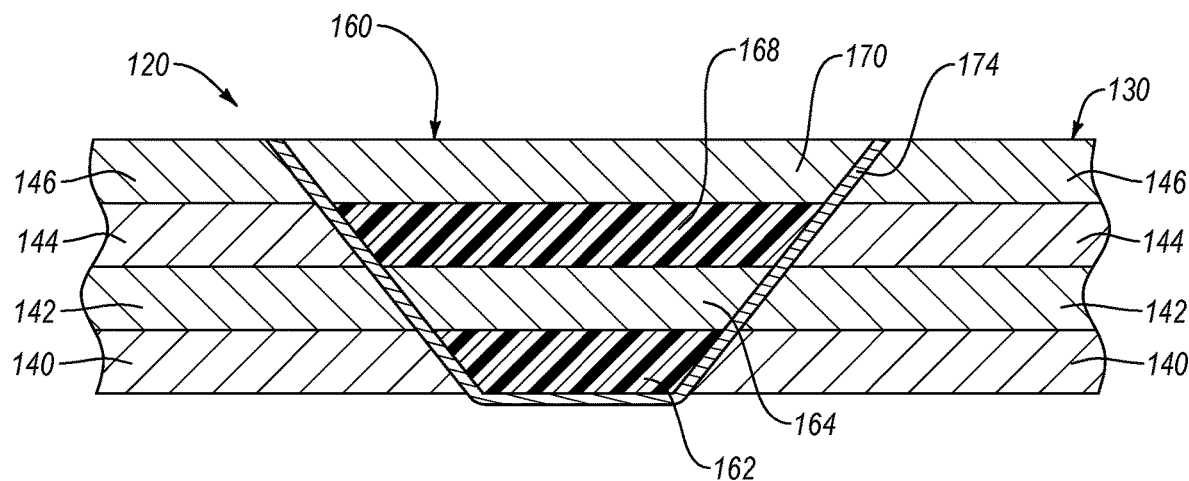
FIG. 10 is a cross-sectional side view of a repair site formed in the composite panel of FIG. 3, according to one or more examples of the present disclosure.

After curing, as shown in FIGS. 10 and 11, each nanotube sheet ply of the patch 160 is directly adjacent (e.g., abutting or flush against) at least one fiber-reinforced polymer repair ply of the patch 160. In other words, although in some embodiments, a resin layer may be between the nanotube sheet plies and the reinforced polymer repair plies of the patch 160 before the patch 160 is cured, after curing, the nanotube sheet and fiber-reinforced polymer repair plies of the patch 160 are directly adjacent each other.

Figure 12:
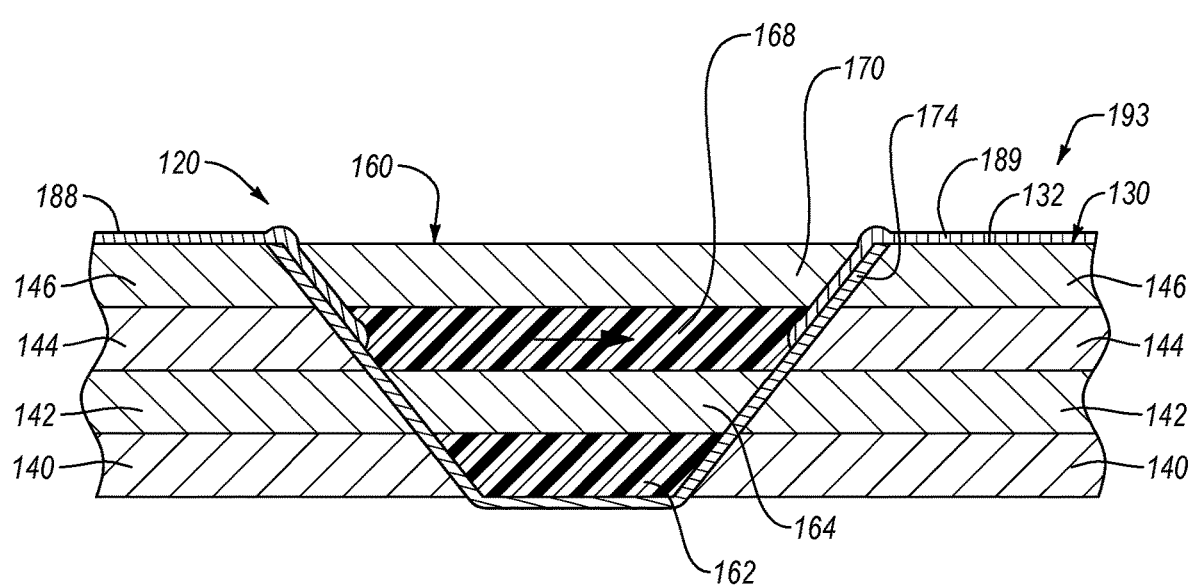
FIG. 12 is a cross-sectional side view of yet another repair site formed in the composite panel of FIG. 3, with a repair status circuit integrated into the repair site, according to one or more examples of the present disclosure.

Referring to FIG. 12, in some implementations, one or more of the nanotube sheet plies of the patch 160 can form part of a repair sensor 193 that determines a repair status of the repair site 120 of the composite panel 130. The repair sensor 193 includes opposing electrical leads 188, 189 electrically coupled with one or more of the nanotube sheet plies of the patch 160. In the illustrated implementation, the electrical leads 188, 189 are electrically coupled with the second nanotube sheet ply 168 of the patch 160. The electrical leads 188, 189 can be applied onto the adhesive layer 174 prior to positioning the patch 160 into the void 150.

Although not shown, the electrical leads 188, 189 are also electrically coupled with an electrical power source and an electrical signal meter, such as a voltmeter, capable of measuring characteristics (e.g., amplitude, frequency, etc.) of an electrical signal. The electrical power source generates an electrical signal and transmits the electrical signal through the second nanotube sheet ply 168 (or other nanotube sheet ply or plies) via the electrical leads 188, 189. For example, the electrical signal from the electrical power source may be transmitted from the electrical lead 188, through the second nanotube sheet ply 168, and to the electrical lead 189. The characteristics of the electrical signal entering and exiting the nanotube sheet ply or plies can be monitored by the electrical signal meter. Based on a comparison between the characteristics of the electrical signal entering and exiting the nanotube sheet ply or plies, a determination of the repair status of the repair site 120 is made. For example, abnormalities in the nanotube sheet ply or plies will cause one or more characteristics of the electrical signal exiting the nanotube sheet ply or plies to be different from those entering the nanotube sheet ply or plies. Monitoring or detecting such a difference in the characteristics of the electrical signal helps to identify abnormalities in the nanotube sheet ply or plies, which affects the repair status of the composite panel 130.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A repair patch in combination with an aircraft on which the repair patch is disposed, wherein the repair patch is for repairing a composite structure comprising fiber-reinforced polymer plies each with unidirectional fibers and wherein:
the repair patch comprises:
a first nanotube sheet ply comprising multi-directional carbon nanotubes, wherein the first nanotube sheet ply is without fibers; and
a first fiber-reinforced polymer repair ply stacked relative to the first nanotube sheet ply and comprising unidirectional fibers embedded within a first resin; and
the aircraft comprises:
a composite panel, comprising fiber-reinforced polymer plies each with unidirectional fibers; and
a repair site formed in the composite panel, the repair site having a void; and
the repair patch is disposed in the void.

2. The repair patch in combination with the aircraft according to claim 1, wherein the first nanotube sheet ply further comprises a second resin and the multi-directional carbon nanotubes are embedded within the second resin.

3. The repair patch in combination with the aircraft according to claim 2, wherein the first resin and the second resin are the same.

4. The repair patch in combination with the aircraft according to claim 2, wherein the first resin and the second resin are different.

5. The repair patch in combination with the aircraft according to claim 2, wherein:
the fiber-reinforced polymer plies of the composite panel comprise at least a first fiber-reinforced polymer ply with unidirectional fibers in a first direction, a second fiber-reinforced polymer ply with unidirectional fibers in a second direction, a third fiber-reinforced polymer ply with unidirectional fibers in a third direction, and a fourth fiber-reinforced polymer ply with unidirectional fibers in a fourth direction;
the repair patch further comprises:
a second nanotube sheet ply comprising multi-directional nanotubes embedded within a third resin, wherein the second nanotube sheet ply is without fibers and the third resin is the same as the second resin; and
a second fiber-reinforced polymer repair ply directly adjacent the second nanotube sheet ply and comprising unidirectional fibers embedded within a fourth resin, wherein the fourth resin is the same as the first resin;
the first fiber-reinforced polymer repair ply of the repair patch is co-planar with the first fiber-reinforced polymer ply of the composite panel and the unidirectional fibers of the first fiber-reinforced polymer repair ply are parallel to the unidirectional fibers of the first fiber-reinforced polymer ply;
the first nanotube sheet ply of the repair patch is co-planar with the second fiber-reinforced polymer ply of the composite panel;
the second fiber-reinforced polymer repair ply of the repair patch is co-planar with the third fiber-reinforced polymer ply of the composite panel and the unidirectional fibers of the second fiber-reinforced polymer repair ply are parallel to the unidirectional fibers of the third fiber-reinforced polymer ply; and
the second nanotube sheet ply of the repair patch is co-planar with the fourth fiber-reinforced polymer ply of the composite panel.

6. The repair patch in combination with the aircraft according to claim 5, wherein one of:
the second fiber-reinforced polymer repair ply of the repair patch is directly adjacent the first nanotube sheet ply of the repair patch; or
the second nanotube sheet ply of the repair patch is directly adjacent the first fiber-reinforced polymer repair ply of the repair patch.

7. The repair patch in combination with the aircraft according to claim 1, wherein:
the composite panel and the repair patch form a scarf joint; and
the repair patch is nestably engaged with the composite panel within the void.

8. The repair patch in combination with the aircraft according to claim 1, further comprising an adhesive layer in the void between the repair patch and the composite panel.

9. The repair patch in combination with the aircraft according to claim 1, wherein:
the fiber-reinforced polymer plies of the composite panel comprise at least a first fiber-reinforced polymer ply with unidirectional fibers in a first direction and a second fiber-reinforced polymer ply with unidirectional fibers in a second direction, different than the first direction;
the first fiber-reinforced polymer repair ply of the repair patch is co-planar with the first fiber-reinforced polymer ply;
the unidirectional fibers of the first fiber-reinforced polymer repair ply are in a third direction, parallel to the first direction; and
the first nanotube sheet ply of the repair patch is co-planar with the second fiber-reinforced polymer ply.

10. The repair patch in combination with the aircraft according to claim 1, wherein the first nanotube sheet ply is void of resin.

11. The repair patch in combination with the aircraft according to claim 1, further comprising:
a first resin layer between the first nanotube sheet ply and the first fiber-reinforced polymer repair ply; and
a second resin layer, wherein the first nanotube sheet ply is sandwiched between the first resin layer and the second resin layer.

12. The repair patch in combination with the aircraft according to claim 1, wherein the void and the repair patch each has a frusto-conical shape.

13. The repair patch in combination with the aircraft according to claim 1, wherein the void has a length-to-depth taper ratio of between 15:1 and 20:1.

14. The repair patch in combination with the aircraft according to claim 1, wherein the void is a through-void that extends entirely through the composite structure.

15. The repair patch in combination with the aircraft according to claim 14, further comprising a backup layer, wherein:
the void comprises a first opening in an outer surface of the composite panel and a second opening in an inner surface of the composite panel; and
the repair patch in combination with the aircraft further comprises a backup layer secured to the inner surface of the composite panel over the second opening.

16. The repair patch in combination with the aircraft according to claim 15, wherein the backup layer is made of a fiber-reinforced polymer material.

17. The repair patch in combination with the aircraft according to claim 2, wherein the first resin and the second resin are thermoset resins.

18. A repair patch in combination with a composite structure on which the repair patch is disposed, wherein the repair patch is for repairing the composite structure, which comprises fiber-reinforced polymer plies each with unidirectional fibers, and wherein:

the repair patch comprises:
- a first nanotube sheet ply comprising multi-directional carbon nanotubes, wherein the first nanotube sheet ply is without fibers; and
- a first fiber-reinforced polymer repair ply stacked relative to the first nanotube sheet ply and comprising unidirectional fibers embedded within a first resin; and the composite structure comprises:
- a composite panel, comprising fiber-reinforced polymer plies each with unidirectional fibers; and
- a repair site formed in the composite panel, the repair site having a void; and the repair patch is disposed in the void.

19. The repair patch in combination with the composite structure according to claim 18, wherein the first nanotube sheet ply is void of resin.

20. The repair patch in combination with the composite structure according to claim 18, further comprising:
- a first resin layer between the first nanotube sheet ply and the first fiber-reinforced polymer repair ply; and
- a second resin layer, wherein the first nanotube sheet ply is sandwiched between the first resin layer and the second resin layer.

\* \* \* \* \*